(12) United States Patent
Hortmanns et al.

(10) Patent No.: US 9,874,004 B2
(45) Date of Patent: Jan. 23, 2018

(54) DEVICE FOR CHANGING THE JET SHAPE OF FREE-FLOWING PRODUCTS

(71) Applicant: SIG Technology AG, Neuhausen am Rheinfall (CH)

(72) Inventors: Johannes Hortmanns, Wegberg (DE); Christian Rabe, Aachen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/026,107

(22) PCT Filed: Aug. 26, 2014

(86) PCT No.: PCT/EP2014/068049
§ 371 (c)(1),
(2) Date: Mar. 30, 2016

(87) PCT Pub. No.: WO2015/043854
PCT Pub. Date: Apr. 2, 2015

(65) Prior Publication Data
US 2016/0236924 A1    Aug. 18, 2016

(30) Foreign Application Priority Data

Sep. 30, 2013    (DE) .................. 10 2013 110 774

(51) Int. Cl.
*E03C 1/08*    (2006.01)
*B67C 3/26*    (2006.01)
(Continued)

(52) U.S. Cl.
CPC .................. *E03C 1/08* (2013.01); *B05B 1/00* (2013.01); *B05B 1/14* (2013.01); *B65B 3/22* (2013.01);
(Continued)

(58) Field of Classification Search
CPC ......................................................... F15D 1/02
(Continued)

(56) References Cited

U.S. PATENT DOCUMENTS 3,913,801 A    10/1975  Wise et al.
3,913,845 A    10/1975  Tsuji
(Continued)

FOREIGN PATENT DOCUMENTS

CN    1105645 A    7/1995
CN    1118149 A    3/1996
(Continued)

*Primary Examiner* — Timothy L Maust
*Assistant Examiner* — Timothy P Kelly
(74) *Attorney, Agent, or Firm* — The Webb Law Firm

(57) ABSTRACT

A device for changing the jet shape of free-flowing products, in particular of foodstuffs, including: an inflow area for the free-flowing products to enter, an outflow area for the free-flowing products to exit, and several channels through which to pass the free-flowing products. Each channel includes an inlet allocated to the inflow area and an outlet allocated to the outflow area. The inlets together form an inflow surface with a width and height lying in the inflow area. The outlets together form an outflow surface with a width and height lying in the outflow area. In order to reduce splashing when filling packagings with a non-rotationally symmetrical cross section, the outflow surface is non-rotationally symmetrical.

17 Claims, 3 Drawing Sheets

(51) Int. Cl.
*B67C 3/28* (2006.01)
*B05B 1/00* (2006.01)
*B65B 55/02* (2006.01)
*B65B 3/22* (2006.01)
*B05B 1/14* (2006.01)
*B65B 39/00* (2006.01)

(52) U.S. Cl.
CPC .............. *B65B 39/00* (2013.01); *B65B 55/02* (2013.01); *B67C 3/2608* (2013.01); *B67C 3/281* (2013.01); *B65B 2039/009* (2013.01)

(58) Field of Classification Search
USPC ...... 141/286; 138/37; 239/590.3, 590.5, 504
See application file for complete search history.

(56) References Cited

U.S. PATENT DOCUMENTS

| | | | | |
|---|---|---|---|---|
| 4,512,379 A | * | 4/1985 | Hennig | B65B 3/22 141/286 |
| 4,559,275 A | * | 12/1985 | Matt | F01D 9/023 137/625.28 |
| 4,574,853 A | * | 3/1986 | Graffin | B65B 39/00 138/44 |
| 4,711,277 A | * | 12/1987 | Clish | B65B 3/22 141/1 |
| 5,813,197 A | | 9/1998 | Aguzzoli | |
| 6,076,750 A | * | 6/2000 | Mykkanen | B65B 39/00 141/311 A |
| 8,459,315 B2 | | 6/2013 | Clüsserath et al. | |

FOREIGN PATENT DOCUMENTS

| | | |
|---|---|---|
| CN | 1447774 A | 10/2003 |
| CN | 101588985 A | 11/2009 |
| DE | 1823285 U | 12/1960 |
| DE | 2354268 A1 | 7/1974 |
| DE | 2504621 A1 | 8/1975 |
| EP | 0278560 A1 | 8/1988 |
| EP | 1908855 A1 | 4/2008 |
| EP | 2078678 A1 | 7/2009 |
| FR | 2511971 A1 | 3/1983 |
| FR | 2905121 A1 | 2/2008 |
| WO | 9715493 A1 | 5/1997 |
| WO | 2013064299 A1 | 5/2013 |

\* cited by examiner

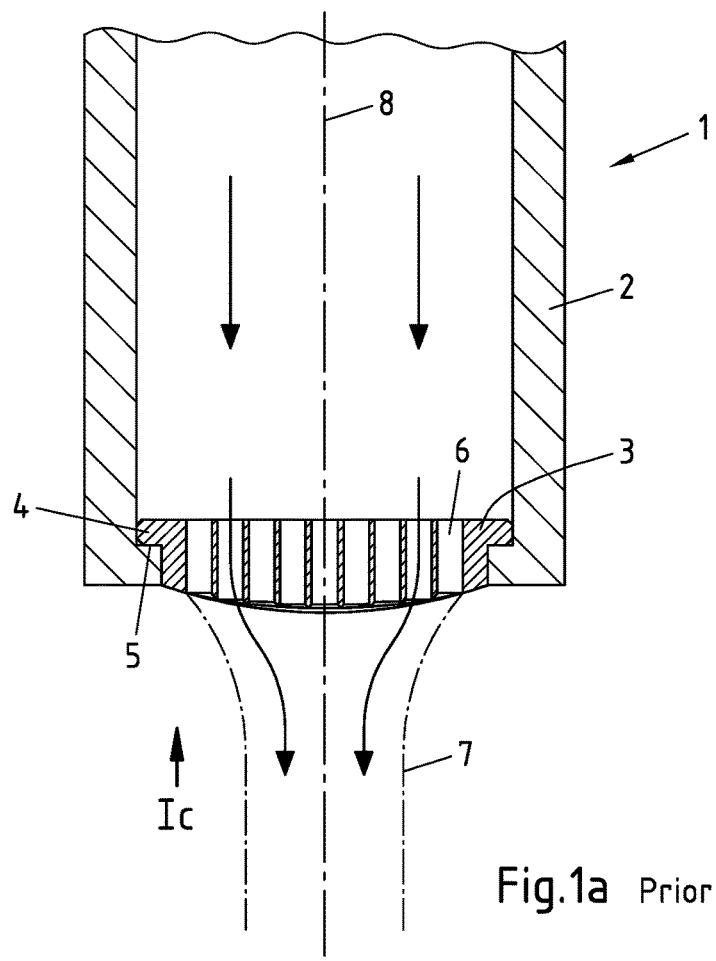
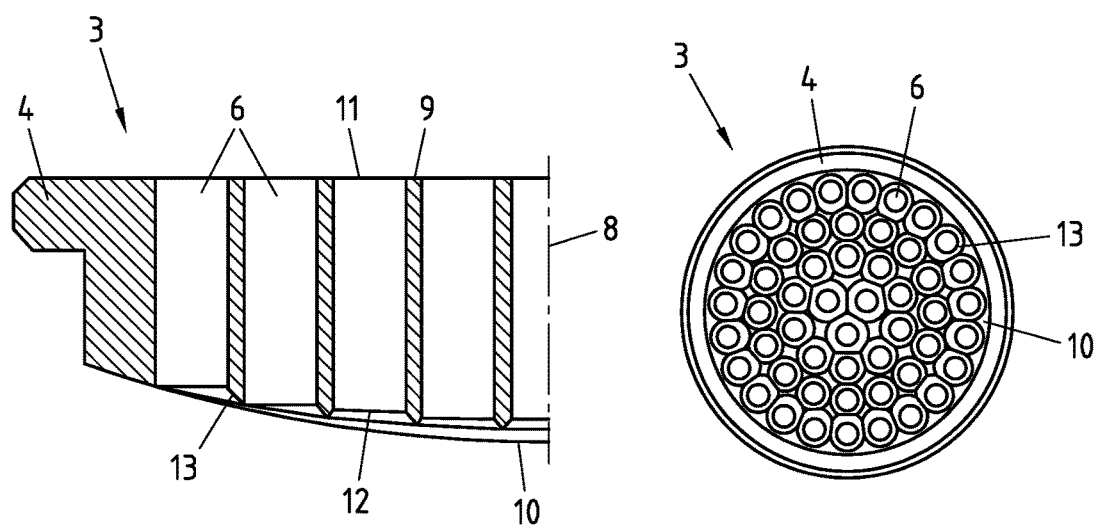
Fig.1a Prior Art
Fig.1b Prior Art       Fig.1c Prior Art

DEVICE FOR CHANGING THE JET SHAPE OF FREE-FLOWING PRODUCTS

CROSS-REFERENCE TO RELATED APPLICATIONS

This application is the United States national phase of International Application No. PCT/EP2014/068049 filed Aug. 26, 2014, and claims priority to German Patent Application No. 10 2013 110 774.5 filed Sep. 30, 2013, the disclosures of which are hereby incorporated in their entirety by reference.

BACKGROUND OF THE INVENTION

Field of the Invention

The invention relates to a device for changing the jet shape of free-flowing products, in particular of foodstuffs, comprising: An inflow area for the free-flowing products to enter, an outflow area for the free-flowing products to exit, and several channels through which to pass the free-flowing products, wherein each channel comprises an inlet allocated to the inflow area and an outlet allocated to the outflow area, wherein the inlets together form an inflow surface with a width and height lying in the inflow area, and wherein the outlets together form an outflow surface with a width and height in the outflow area.

The invention also relates to the use of such a device for filling foodstuffs, in particular for aseptically filling foodstuffs.

Description of Related Art

Known in the area of packaging technology are numerous ways of filling free-flowing products into the packagings provided for this purpose. For example, the free-flowing products can be foodstuffs like milk, fruit juice, sauces or yogurt. Composite packagings with layers made of cardboard and plastic can be used as the packagings, for example.

One important step in filling the packagings has to do with filling the free-flowing products into the packagings as quickly as possible, so that a fast rhythm, and hence high numbers, can be achieved. However, filling is to take place largely without splashing and frothing despite the high flow rate, so that the hygiene requirements can be met, and to prevent the packaging or filling machine from becoming contaminated. Especially stringent hygiene requirements are encountered for foodstuffs that are filled under sterile, i.e., germfree, conditions.

The stringent requirements can only be satisfied by adjusting the filling process to individual factors, for example the properties of the product to be filled and the volume and shape of the packaging. The adjustment routinely involves setting the flow volume and flow rate. In addition, the filling nozzle is often tailored to the product to be filled and the packaging, and changed out as needed. The filling nozzle largely determines the shape and speed profile of the filling jet. In addition, the filling nozzle is responsible for a drip-free filling. To this end, the volume flow is divided into several partial flows before exiting the filling nozzle, which are guided through individual channels. The advantage to this is that the product to be filled comes into contact with a larger wall surface, so that the residual quantity of product to be filled is reliably held in the channels if filling is interrupted, and does not drip uncontrollably onto the packaging or filling machine ("capillary effects").

Many of the known filling nozzles have a housing with a round cross sectional area. In addition, both the inflow area and outflow area of known filling nozzles often have a round shape. The round housing makes possible to easily insert the filling nozzles into known filling machines in any rotated position desired. The round inflow and outflow areas yield a filling jet whose cross section is also round.

A filling nozzle for filling foodstuffs is known from EP 2 078 678 A1, for example. The filling nozzle shown therein comprises a replaceable, round and hence rotationally symmetrical plate with numerous holes for dividing up the volume flow. The holes are cylindrically shaped, and run parallel to each other so as to generate an especially straight filling jet with the plate ("flow straightening plate"). While the inlets of the holes lie in one plane, the outlets of the holes are situated on a curved surface, so that the holes vary in length viewed in the direction of flow. Varying the length of the holes is intended to influence the flow rate. In particular, the flow rate in the middle of the filling jet is to be decelerated more strongly by longer holes and the resultant higher friction than in the edge areas of the filling jet.

The filling nozzle known from EP 2 078 678 A1 has several disadvantages. First, the two-part construction makes it necessary to seal the plate away from the body of the filling nozzle. Residual product can become deposited in the gap between the plate and body to be sealed, which poses hygiene problems. Another disadvantage lies in the varying length of the holes. This is because a curved outflow area of the plate causes the partial flows of the product to be filled to detach from the underside of the plate at different times, and additionally exposes them to a varying drop height to the floor of the packaging. Those partial flows that are guided through shorter holes and detach from the underside of the plate sooner experience a gravitational acceleration earlier than those partial flows that are still in the longer holes at this point in time. The varying drop heights cause the partial flows to accelerate for different times during freefall, and to accelerate at different increments. As a consequence, the velocity profile that arises on the underside of the plate is again altered during freefall. As a result, the velocity profile of crucial importance with respect to splashing as the filling jet impacts the bottom of the packaging can only be set very imprecisely with the proposed solution.

Another disadvantage to the filling nozzle known from EP 2 078 678 A1 and other comparable filling nozzles is that these filling nozzles can generate exclusively filling jets with a round cross sectional area. This stems in particular from the arrangement of holes in a round plate. Round filling jets are also sought in numerous cases. In the first place, the round shape is the shape that forms in the free-flowing product anyway with the jet in freefall due to the surface tension (cohesion). In addition, the housings for most filling nozzles have a round shape, so that they can be placed in the (usually also round) receptacles of known filling machines. Finally, round cross sections represent the optimal shape in terms of fluid mechanics, since they offer the smallest surface, and thus the lowest flow resistance in relation to the size of the cross sectional area.

In packagings with a round surface area, for example bottles, round filling jets are also to be regarded as advantageous with respect to splashing. However, many packagings exhibit non-rotationally symmetrical, for example rectangular, surface areas. A round filling jet can lead to problems in these packagings. This is because a round filling jet is geometrically constrained to exhibit a significantly smaller distance from two of the lateral walls than from the other two lateral walls when filling packagings with a rectangular surface area. As a result, splashes are not uniformly shielded: The two lateral walls lying close to the jet shield splashes arising at a steep angle quite well, and prevent them from exiting the packaging. However, the two lateral walls lying farther away from the jet are no longer able to shield splashes that move upwardly at the same steep angle. Therefore, the danger becomes that these splashes will exit the packaging and contaminate the packaging or filling machine. As a result, the packaging, for example a cardboard/plastic composite packaging, might become contaminated in the area where it is later to be sealed in welding operations. However, a reliable welded joint can no longer be generated in the contaminated area, so that the packaging can no longer be tightly sealed, and must be rejected. If the leak is not detected right away, the leaky packaging may contaminate parts of the filling machine or other packagings in further processing steps or during transport. Since many foodstuffs must be filled under sterile, or germfree, conditions, such contaminations of the filling machine can necessitate expensive cleaning and renewed sterilization of the entire filling machine. No filling can take place during this time, thus leading to losses in production. By contrast, the contamination of other packagings may render larger units or pallets of packagings unsalable. For this reason, individual splashes exiting the packaging can already cause significant problems.

Therefore, an object of the invention is to configure and further develop the device described above in greater detail in such a way as to diminish splashing when filling packagings with a non-rotationally symmetrical cross section.

In a device according to the preamble of claim 1, this object is achieved by virtue of the fact that the outflow surface is non-rotationally symmetrical.

SUMMARY OF THE INVENTION

A device according to the invention is initially distinguished by an inflow area for the free-flowing products to enter, as well as by an outflow area for the free-flowing products to exit. Situated between the inflow area and outflow area are several channels for guiding through the free-flowing products. Each of the channels comprises an inlet that is allocated to the inflow area. In addition, each of the channels comprises an outlet that is allocated to the outflow area. The inlets together form an inflow surface lying in the inflow area, and the outlets together form an outflow surface lying in the outflow area. For example, the device according to the invention can be made out of metal, in particular out of steel, preferably stainless steel.

According to the invention, the outflow surface is non-rotationally symmetrical. The symmetry will be examined in relation to the middle axis of the device. The shape of the outflow surface has a significant influence on the shape of the cross sectional area of the exiting filling jet. The invention thus calls for abandoning known, rotationally symmetrical cross sections. Selected instead is an outflow surface that is non-rotationally symmetrical, and in particular not circular. The outflow surface can be quadrangular, in particular rectangular or square in shape. In like manner, the inflow surface can be quadrangular, in particular rectangular or square in shape. The shape of the inflow surface determines the shape of the filling jet to less of an extent than the shape of the outflow surface. However, the advantage to a correspondingly shaped inflow surface is that the shape of the channels joining the inflow surface with the outflow surface can be given a simpler design, and the partial flows streaming through the channels need not be deflected as strongly.

The design of the outflow and/or inflow surface according to the invention generates a filling jet whose cross sectional area is also non-rotationally symmetrical, but rather quadrangular in shape, for example. In freefall, the cross sectional area again changes back toward a round cross section due to the surface tension. However, it was surprisingly found that the non-rotationally symmetrical cross sectional area of the filling jet stays at least partially intact given relatively short drop heights of the kind common for most packagings. Therefore, the invention is based upon the principle of adjusting the geometry of the filling jet to the surface area of the packaging to be filled.

In an embodiment of the invention, the height of the outflow surface is greater than its width. Therefore, an outflow surface whose size varies in the two primary directions running perpendicular to each other is selected in this embodiment. For example, the outflow surface can be roughly rectangular in shape. The height of the outflow surface is preferably at least 1.3 times, in particular at least 1.4 times greater than its width.

In a corresponding manner, the height of the inflow surface can be greater than its width. The height of the inflow surface is also preferably at least 1.3 times, in particular at least 1.4 times greater than its width.

In a further development of the invention, the inlets and/or outlets of the channels are arranged in a plane. The advantage to arranging the inlets in one plane is that all inlets can be reliably sealed at the same time by an especially simply designed, in particular flat, sealing element. The advantage to arranging the outlets in one plane is that all partial flows detach from the underside of the device simultaneously, and hence are exposed to gravitational acceleration simultaneously. The plane in which the channel outlets are arranged is preferably parallel to the plane in which the channel outlets are arranged. At least for channels that follow a straight line progression, the advantage to this is that the channels are equally long, and hence the friction-induced deceleration of partial flows is roughly the same in all channels.

Another instruction of the invention provides that the inlets and/or outlets of the eccentric channels be circularly arranged on rings around the middle axis of the device. An eccentric channel is understood as any channel that does not run along the middle axis of the device. According to this instruction, several channels can be arranged in such a way that their inlets and/or outlets are equidistant from the middle axis. This makes it possible to generate a uniform, symmetrically shaped filling jet.

In an embodiment of the invention, the inlets and/or outlets on the outermost ring are arranged in two opposing and separated groups. In other words, the outermost ring is not completely occupied by inlets/outlets. Despite the basically annular arrangement of inlets and/or outlets, this embodiment makes it possible to achieve an inflow surface and/or outflow surface whose width and height vary. Therefore, this embodiment enables the formation of a non-rotationally symmetrical inflow surface and/or a non-rotationally symmetrical outflow surface even given an annular arrangement of the inlets and/or outlets.

In an embodiment of the invention, the number of channels measures at least 30, and in particular ranges between 30 and 50. In this embodiment, the overall flow is to be divided into a particularly high number of partial flows. The advantage to this is that the speed and direction of a respective partial flow can be individually set for each partial flow, so that even complex shapes and velocity profiles can be achieved for the filling jet. In addition, a high number of channels leads to a larger contact surface between the flow and channel, which lowers the risk of dripping if the filling process is interrupted due to a capillary effect.

Another embodiment of the invention proposes that the middle axes of the eccentric channels be inclined by an angle of inclination relative to the middle axis of the device. Tilting the eccentric channels allows a horizontal momentum to also be imparted to the partial flows in these channels in addition to a vertical momentum. This permits an especially variable shaping of the filling jet. The respective channels can be outwardly or inwardly inclined as viewed in the direction of flow. An outward inclination spreads or splits the filling jet, and guides it laterally along the walls of the packaging. In this way, the packaging is filled in an especially gentle manner and largely without frothing. By contrast, an inward inclination allows for a particularly acute, concentrated filling jet.

With regard to this embodiment, it is further proposed that the angle of inclination ranges between 1° and 6°. The angle of inclination is the angle that comes about between the middle axis of the device and the middle axis of the corresponding channel. The indicated range can once again relate to an outward inclination or an inward inclination.

It is further proposed with regard to these two embodiments that the angle of inclination for the eccentric channels rise, in particular continuously or monotonously rise, as the distance between the channels and middle axis of the device increases. As a result, the more outwardly the channel is arranged, the greater the inclination of the channels is to be. The stronger inclination of the outer channels is advantageous in particular given an inward inclination, since an especially thin, concentrated filling jet can be achieved in this way.

As an alternative to the mentioned angles of inclination, it can be provided for the eccentric channels that the angle of inclination measure about 0°. Very small angles of inclination, for example angles of inclination ranging between −0.5° and +0.5°, or channels with absolutely no inclination, yield a filling jet that is neither concentrated nor scattered. The shape of the filling jet thus largely mirrors the shape of the outflow surface at these very small angles of inclination. The advantage to this is that the shape of the filling jet can be adjusted especially precisely to the shape of the packaging, which helps to better shield against splashing.

In another embodiment of the invention, each inlet of a channel comprises a first cross sectional area, and each outlet of a channel comprises a second cross sectional area, and the second cross sectional area of at least one channel is larger than the first cross sectional area of this channel. The second cross sectional area of each channel is preferably larger than the first cross sectional area of this channel. In other words, the cross sectional area of the channels increases in the direction of flow, i.e., from the inlet toward the outlet. The increase in cross sectional area can take place uniformly and continuously or monotonously. Under the laws of fluid mechanics, in particular Bernoulli's principle, an increase in the cross sectional area leads to a proportional decrease in the flow speed. Accordingly, this channel configuration leads to a deceleration of the partial flow streaming in the channel. The quotient of the first cross sectional area and second cross sectional area is thus always less than one, and represents a gauge for the degree of deceleration. As a consequence, this quotient can also be referred to as the "deceleration factor"; by contrast, its reciprocal can be referred to as the "acceleration factor".

With regard to this embodiment, it is further proposed that the quotient comprised of the first cross sectional area and second cross sectional area for each channel ranges from 0.35 to 0.75. This means that the cross sectional area at the inlet of each individual channel measures only about 35% to 75% of the cross sectional area at the outlet of this channel. As a consequence, each individual channel is to help tangibly enlarge the cross sectional area, and thus slow down the flow to an extent lying within the mentioned range. It can be provided that the quotient comprised of the first cross sectional area and second cross sectional area—i.e., the deceleration factor—be identical for each channel; alternatively, the quotients can also vary within the mentioned range between the channels, so that flow deceleration can be individually adjusted for each channel.

Finally, in another instruction of the invention, the eccentric channels are spaced apart from the middle axis of the device, and the quotient comprised of the first cross sectional area and second cross sectional area drops, in particular continuously or monotonously drops, as the distance between the eccentric channels and middle axis of the device rises. Therefore, this instruction provides that the quotient comprised of the first cross sectional area and second cross sectional area—i.e., the deceleration factor—be smaller for the outlying channels than for the more inwardly lying channels. The flow in the outlying channels is thus to be slowed to a greater extent than the more inwardly lying channels. The deceleration factor here preferably becomes increasingly smaller the farther out the channel is situated.

The device described above can be used especially well in all described embodiments to fill foodstuffs, in particular to aseptically fill foodstuffs. For example, the foodstuffs can be milk, fruit juice, sauces or yoghurt.

BRIEF DESCRIPTION OF THE DRAWINGS

The invention will be described in greater detail below based upon a drawing that only represents a preferred exemplary embodiment. The drawing shows:

FIG. 1a a filling nozzle known from the prior art,

FIG. 1b a cross section depicting a magnified cutout of the filling nozzle plate from FIG. 1a, FIG. 1c the filling nozzle plate from FIG. 1a along the intersecting plane Ic-Ic recorded on FIG. 1a, FIG. 2a a cross section depicting a device according to the invention for changing the jet shape of free-flowing products, FIG. 2b a cross section depicting the device from FIG. 2a along the intersecting plane IIb-IIb recorded on FIG. 2a, and FIG. 2c a cross section depicting the device from FIG. 2a along the intersecting plane IIc-IIc recorded on FIG. 2a.

DETAILED DESCRIPTION OF THE INVENTION

Figure 2A:
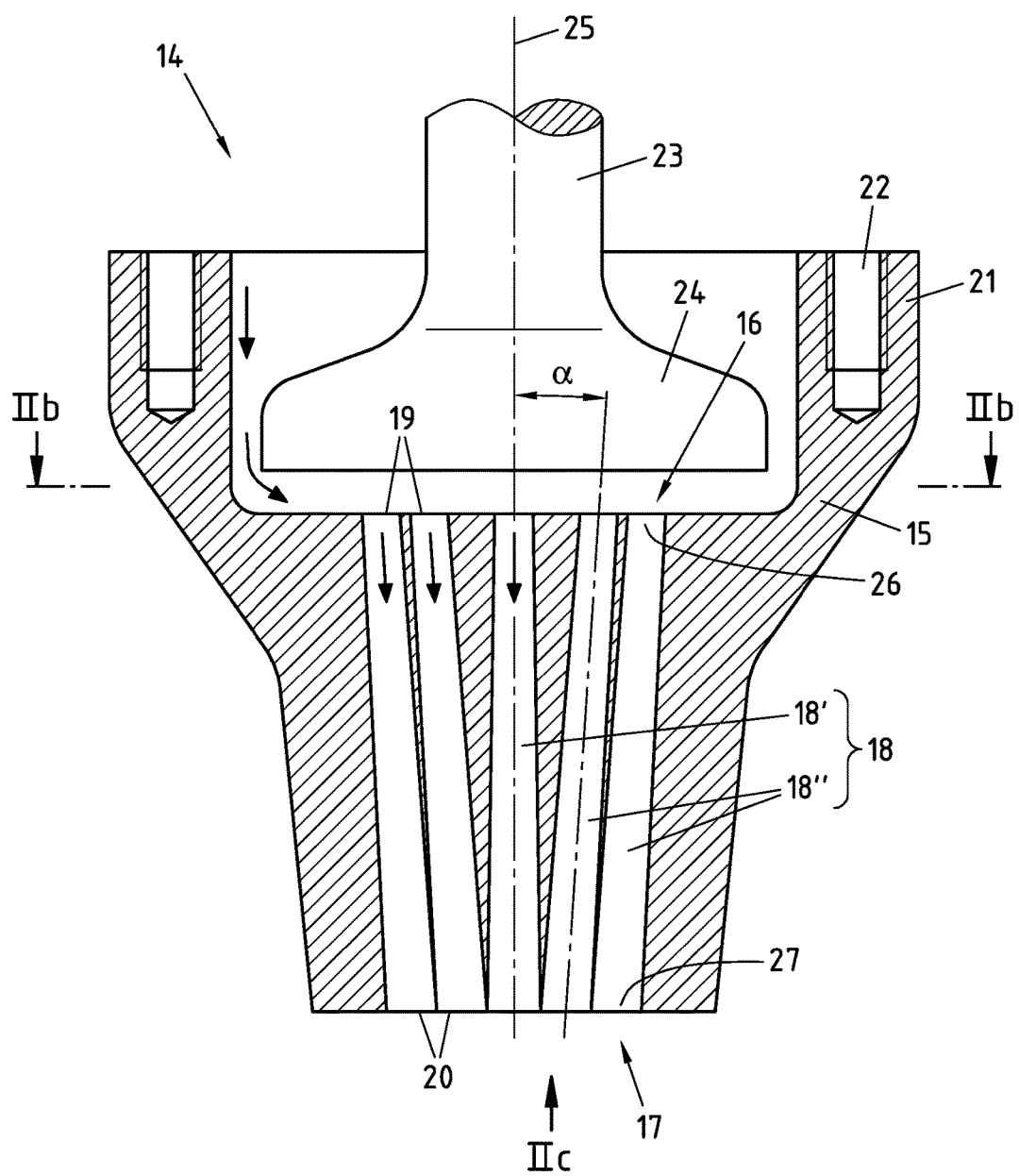

FIG. 1 presents a cross section depicting a filling nozzle 1 known from the prior art. The filling nozzle 1 comprises a body 2 and a round plate 3 to shape the flow. The plate 3 can be replaceably inserted in the body 2 by placing a continuous flange 4 provided on the plate 3 on a projection 5 provided on the body 2. The plate 3 has several holes 6 that allow free-flowing products to stream through the filling nozzle 1, as schematically denoted by arrows on FIG. 1a. After exiting the filling nozzle 1, the free-flowing products form a jet 7, whose outer contour is depicted on FIG. 1. A middle axis 8 runs centrally through the body 2 and plate 3.

FIG. 1b presents a cross section depicting a magnified cutout of the plate 3 of the filling nozzle 1 from FIG. 1a. The areas of the plate 3 already described in conjunction with FIG. 1a are provided with corresponding reference numbers on FIG. 1b. The plate 3 comprises an upper side 9 for the free-flowing products to enter, and an underside 10 for the free-flowing products to exit. The holes 6 join the upper side 9 with the underside 10. Each hole 6 has an inlet 11 and an outlet 12, wherein the inlets 11 are allocated to holes 6 on the upper side 9, and wherein the outlets 12 are allocated to holes 6 on the underside 10. In the plate 3 depicted on FIG. 1b, all holes 6 run parallel to the middle axis 8 of the plate 3, and thus exhibit no inclination. In addition, the cross sectional area of all holes 6 is identical, and thus does not change in the direction of flow, i.e., from the inlet 11 to the outlet 12. The upper side 9 is formed by a plane, in which lie the inlets 11 of the holes 6. By contrast, the underside 10 is formed by a curved surface, in which lie the outlets 12 of the holes. The underside 10 is curved in such a way that those holes 6 in proximity to the middle axis 8 are longer than those holes 6 lying in the edge area of the plate 3. Continuous chamfers 13 can be provided on the edges of the outlets 12.

FIG. 1c depicts the plate 3 of the filling nozzle 1 from FIG. 1a along the intersecting plane Ic-Ic recorded on FIG. 1a, i.e., viewed from the underside. The areas of the plate 3 already described in conjunction with FIG. 1a and FIG. 1b are also provided with corresponding reference numbers on FIG. 1c. To improve clarity, it was decided not to depict the body 2 on FIG. 1c. As illustrated on FIG. 1c, a plurality of holes 6 are arranged closely together, and take up nearly the entire surface of the plate 3 in the process. The filling nozzle 1 depicted on FIG. 1a, FIG. 1b and FIG. 1c largely corresponds to the filling nozzle known from EP 2 078 678 A1.

FIG. 2a presents a cross section depicting a device 14 according to the invention for changing the jet shape of free-flowing products. The device 14 comprises a one-piece housing 15, which has an inflow area 16 for the free-flowing products to enter, and an outflow area 17 for the free-flowing products to exit. Situated between the inflow area 16 and outflow area 17 are a plurality of channels 18 for guiding through the free-flowing products in the housing 15. Each of the channels 18 comprises an inlet 19 that is allocated to the inflow area 16, and an outlet 20 that is allocated to the outflow area 17. In the device 14 shown on FIG. 2a, both the inflow area 16—and hence also the inlets 19—as well as the outflow area 17—and hence also the outlets 20—are arranged in one plane, wherein the two planes lie parallel to each other. Finally, the upper side of the device 14 comprises a continuous flange 21 that incorporates several boreholes 22. For example, the device 14 can be connected with a filling machine via the boreholes 22.

FIG. 2a further presents a valve rod 23 with a sealing element 24. While these components are not part of the device 14, they do serve to explain how it functions. In order to interrupt the flow streaming through the device 14—schematically denoted with arrows on FIG. 2a—the valve rod 23 is lowered, so that the sealing element 24 is pressed onto the inflow area 16 and seals the inlets 19 of the channels 18 located there. A middle axis 25 runs centrally through the valve rod 23, the sealing element 24 and the device 14.

In the device 14 exemplarily depicted on FIG. 2a, the channels 18 can be divided into one central channel 18' and into several eccentric channels 18". The middle axis of the central channel 18' corresponds to the middle axis 25 of the device; therefore, the central channel 18' runs straight down, and stands perpendicularly on the two planes of the inflow area 16 and outflow area 17. By contrast, the middle axes of the eccentric channels 18" are inclined relative to the middle axis 25 of the device 14 by an angle of inclination α. The angle of inclination for the eccentric channels 18" rises continuously or monotonously as does the distance between the channels 18" and middle axis 25 of the device 14. In other words, those eccentric channels 18" with the greatest distance from the middle axis 18"—i.e., the radially outlying channels 18"—are inclined the most. Viewed in the direction of flow, the eccentric channels 18" are inclined toward the middle axis 25, so that the outlets 20 of the channels 18" lie closer to the middle axis 25 than the inlets 19 of the channels 18".

The channels 18 of the device 14 exemplarily depicted on FIG. 2a have a first cross sectional area 26 and a second cross sectional area 27, wherein the first cross sectional area 26 is measured at the inlets 19, and wherein the second cross sectional area 27 is measured at the outlets 20. The channels in the device 14 shown on FIG. 2a are distinguished by the fact that the second cross sectional area 27 of each channel 18 is larger than the first cross sectional area 26 of this channel 18. This relates both to the central channel 18' and eccentric channels 18". In other words, the cross sectional area of the channels 18 increases from their inlets 19 to their outlets 20 as viewed in the direction of flow.

Figure 2B:
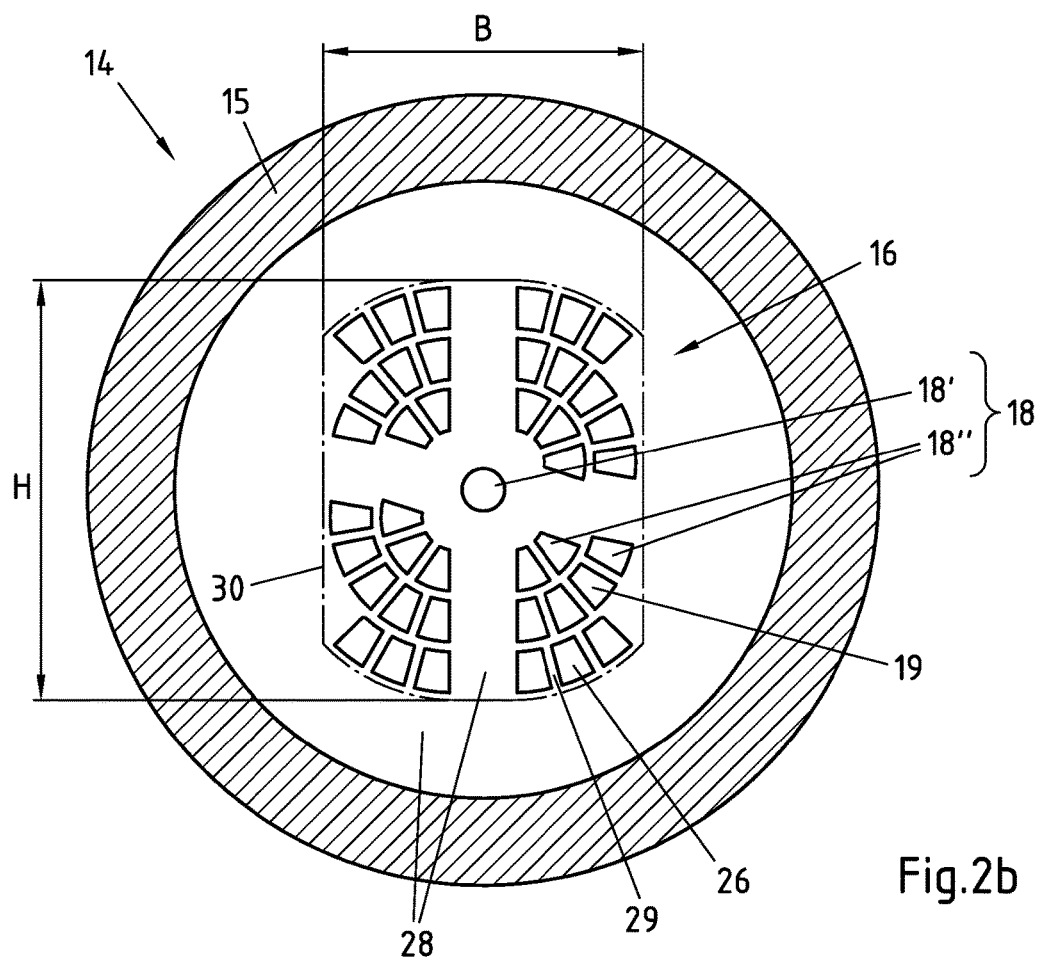

FIG. 2b presents a cross section depicting the device 14 from FIG. 2a along the intersecting plane IIb-IIb recorded on FIG. 2a. Accordingly, FIG. 2b provides a view of the inflow area 16 of the device 14. The areas of the device 14 already described in conjunction with FIG. 2a are marked with the corresponding reference numbers on FIG. 2b. As evident from FIG. 2b, the device 14 has a circular cross section. In the device 14 exemplarily depicted on FIG. 2b, the circular area of the inflow area 16 can be divided into sealing areas 28 and four entry areas 29, of which each covers roughly an area of 90°. The sealing areas 28 are intended for the sealing abutment by the sealing element 24 not shown on FIG. 2b. Nine eccentric channels 18" are arranged in two of the four inflow areas 29, and eleven eccentric channels 18" are arranged in the other two inflow areas 29. The inlets 19 of the channels 18" are visible in all inflow areas 29. The central channel 18' lies in the middle of the inflow area 16. The inlets 19 of the channels 18 in the device 14 depicted on FIG. 2b exhibit a specific pattern: The eccentric channels 18" are circularly arranged on three concentric rings around the central channel 18'. The first, innermost ring has ten channels 18" (two inflow areas 29 each with two channels 18" and two inflow areas 29 each with three channels 18"). The second ring has eighteen channels 18" (two inflow areas 29 each with four channels 18" and two inflow areas 29 each with five channels 18"), and the third, not completely occupied ring has twelve channels 18" (four inflow areas 29 each with three channels 18"). A total of one hundred forty channels 18 are thus present.

In the device 14 exemplarily shown on FIG. 2b, the inlets 19 together form an inflow surface 30 lying in the inflow area 16 with a width B and height H. The inflow surface 30 is formed by lines or curves, which encompass all inlets 19, and thus are tangent to the edges of the outer inlets 19. The twelve inlets 19 on the outermost ring are arranged in two opposing and separated groups, so that the height H of the inflow surface 30 is significantly larger than its width B. The shape of the inflow surface 30 is roughly rectangular.

Figure 2C:
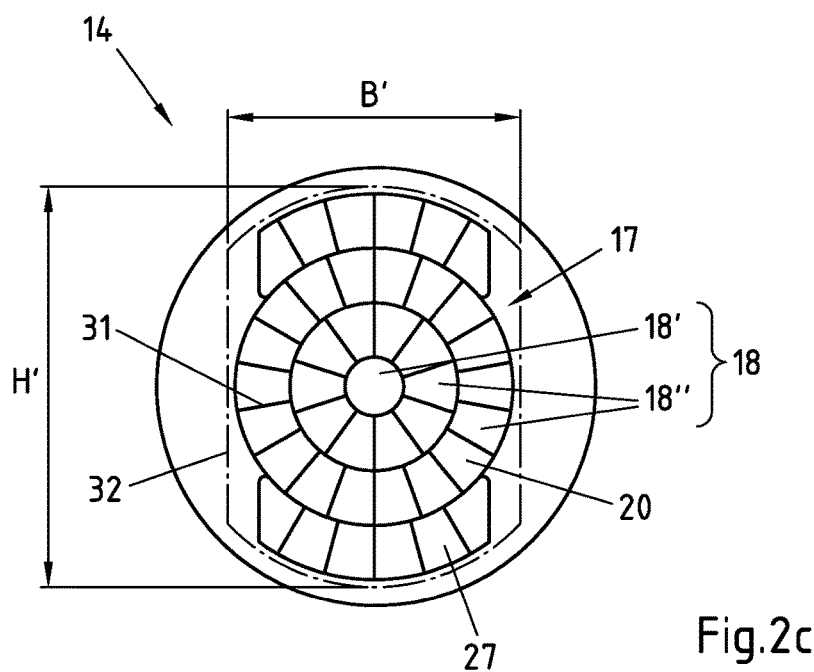

FIG. 2c presents a cross section depicting the device 14 from FIG. 2a along the intersecting plane IIc-IIc recorded on FIG. 2a. Accordingly, FIG. 2c provides a view of the outflow area 17 of the device 14. The areas of the device 14 already described in conjunction with FIG. 2a or FIG. 2b are marked with the corresponding reference numbers on FIG. 2c. As opposed to the surface of the inflow area 16, the surface of the outflow area 17 is no longer divided into sealing areas 28 and entry areas 29, first of all since no surface for abutment by the sealing element 24 is there necessary, and second of all since more surface is needed for the channel cross sections that are enlarged in this region. For this reason, the channels 18 in the plane of the outflow area 17 are only still separated from each other by very narrow webs 31. The eccentric channels 18" of the outflow area 17 are also arranged around the central channel 18' on three concentric rings, of which the outermost ring is not completely occupied.

In the device 14 exemplarily shown on FIG. 2c, the outlets 20 together form an outflow surface 32 lying in the outflow area 17 with a width B' and height H'. The outflow surface 32 is formed by lines or curves, which encompass all outlets 20, and thus are tangent to the edges of the outer outlets 20. The twelve outlets 20 on the outermost ring are arranged in two opposing and separated groups, so that the height H' of the outflow surface 32 is significantly larger than its width B'. The shape of the outflow surface 32 is thus also roughly rectangular.

LIST OF REFERENCE NUMBERS

1: Filling nozzle
2: Body
3: Plate
4: Flange
5: Projection
6: Hole
7: Jet
8: Middle axis
9: Upper side
10: Underside
11: Inlet
12: Outlet
13: Chamfer
14: Device
15: Housing
16: Inflow area
17: Outflow area
18, 18', 18": Channel
19: Inlet
20: Outlet
21: Flange
22: Borehole
23: Valve rod
24: Sealing element
25: Middle axis
26: First cross sectional area
27: Second cross sectional area
28: Sealing area
29: Entry area
30: Inflow surface
31: Web
32: Outflow surface
H, H': Height
B, B': Width

The invention claimed is:

1. A device for changing the jet shape of free-flowing products, comprising:
   an inflow area for the free-flowing products to enter,
   an outflow area for the free-flowing products to exit, and
   a plurality of eccentric channels through which to pass the free-flowing products,
   wherein each eccentric channel comprises an inlet allocated to the inflow area and an outlet allocated to the outflow area,
   wherein the inlets together form an inflow surface with a width and height lying in the inflow area,
   wherein the outlets together form an outflow surface with a width and height lying in the outflow area,
   wherein the inlet of each eccentric channel comprises a first cross sectional area, and the outlet of each eccentric channel comprises a second cross sectional area, and
   wherein the second cross sectional area of at least one eccentric channel is larger than the first cross sectional area of this eccentric channel,
   wherein the number of eccentric channels ranges between 30 and 50 and that the outflow surface is non-rotationally symmetrical, and
   wherein an angle of inclination for each eccentric channel rises as a distance between the eccentric channels and a middle axis of the device increases.

2. The device according to claim 1, wherein the height of the outflow surface is greater than the width of the outflow surface.

3. The device according to claim 1, wherein the height of the outflow surface is at least 1.3 times greater than the width of the outflow surface.

4. The device according to claim 1, wherein the height of the inflow surface is greater than the width of the inflow surface.

5. The device according to claim 1, wherein the height of the inflow surface is at least 1.3 times greater than the width of the inflow surface.

6. The device according to claim 1, wherein the inlets and/or outlets of the eccentric channels are arranged in a plane.

7. The device according to claim 1, wherein the inlets and/or outlets of the eccentric channels are circularly arranged on rings around a middle axis of the device.

8. The device according to claim 7, wherein the inlets and/or outlets on an outermost ring are arranged in two opposing and separated groups.

9. The device according to claim 7, wherein a middle axis of each eccentric channel is inclined by the angle of inclination relative to the middle axis of the device.

10. The device according to claim 9, wherein the angle of inclination ranges between 1° and 6°.

11. The device according to claim 1, wherein the angle of inclination measures about 0°.

12. The device according to claim 1, wherein a quotient comprised of the first cross sectional area and second cross sectional area for each channel ranges from 0.35 to 0.75.

13. A method for filling foodstuffs comprising the steps of:
   directing foodstuffs to an inflow area of a device for changing a jet shape of the foodstuffs,
   passing the foodstuffs through several eccentric channels defined by the device, the eccentric channels spaced apart from a middle axis of the device, and
   directing the foodstuffs to an outflow area of the device,
   wherein each eccentric channel comprises an inlet allocated to the inflow area and an outlet allocated to the outflow area,
   wherein the inlets together form an inflow surface with a width and height lying in the inflow area, wherein the outlets together form an outflow surface with a width and height lying in the outflow area, wherein the inlet of each eccentric channel comprises a first cross sectional area, and the outlet of each eccentric channel comprises a second cross sectional area, and wherein the second cross sectional area of at least one eccentric channel is larger than the first cross sectional area of this eccentric channel, wherein the number of eccentric channels ranges between 30 and 50 and that the outflow surface is non-rotationally symmetrical, and wherein an angle of inclination for each eccentric channel rises as a distance between the eccentric channels and a middle axis of the device increases.

14. The method according to claim 13, wherein the foodstuffs are aseptically filled.

15. The device according to claim 1, wherein the free-flowing products are foodstuffs.

16. The device according to claim 3, wherein the height of the outflow surface is at least 1.4 times greater than the width of the outflow surface.

17. The device according to claim 5, wherein the height of the inflow surface is at least 1.4 times greater than the width of the inflow surface.

* * * * *